C. McLEOD.
SPRING BEARING FOR CENTRIFUGAL SEPARATORS.
APPLICATION FILED NOV. 17, 1917.
1,283,840.
Patented Nov. 5, 1918.
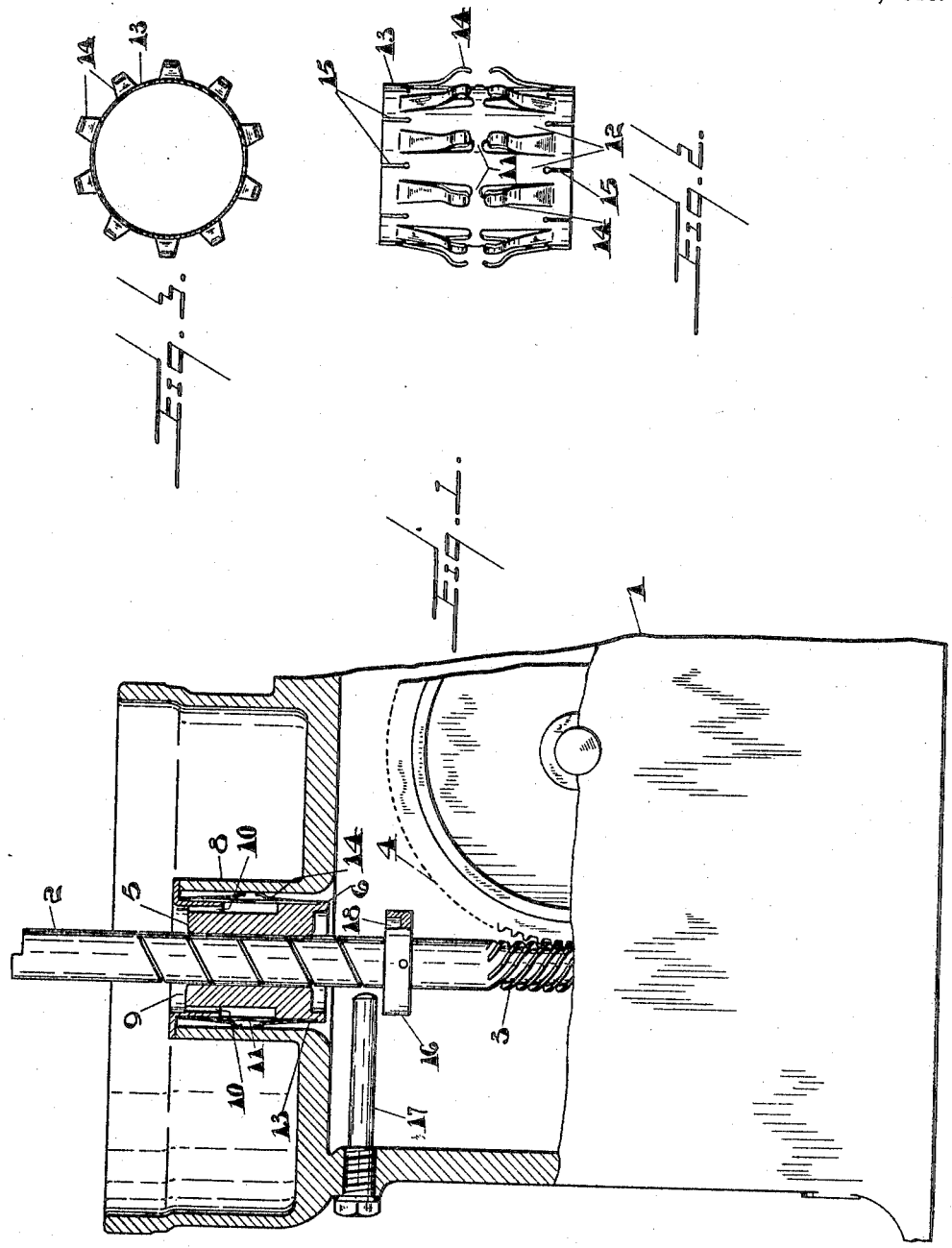
INVENTOR.
C. McLeod.
BY J. Edward Maybee.
ATTY.

UNITED STATES PATENT OFFICE.

CHARLES McLEOD, OF TORONTO, ONTARIO, CANADA, ASSIGNOR TO MASSEY-HARRIS COMPANY, LIMITED.

SPRING-BEARING FOR CENTRIFUGAL SEPARATORS.

1,283,840.

Specification of Letters Patent.

Patented Nov. 5, 1918.

Application filed November 17, 1917. Serial No. 202,538.

*To all whom it may concern:*

Be it known that I, CHARLES McLEOD, of the city of Toronto, in the county of York, Province of Ontario, Canada, have invented certain new and useful Improvements in Spring-Bearings for Centrifugal Separators, of which the following is a specification.

This invention relates to spring bearings used to yieldingly support the upper end of the spindle of a centrifugal separator, and particularly to bearings of the type in which spring tongues are formed from or connected with a sheet metal sleeve fitted between the spindle bearing and the casing.

In designing the present bearing, my object was to obtain as many spring tongues as possible for a given circumference of sleeve without unduly weakening the sleeve by cutting out too much metal, to secure practically complete rigidity midway of the length of the sleeve, and yet to have the points of contact of the free ends of the tongues as nearly in the same zone as possible.

I attain my objects by stamping out pairs of tongues from a sheet metal sleeve, said tongues extending lengthwise of the sleeve with the tongues of each pair in alinement with one another and having their free ends adjacent one another, but separated so that bridges connect the longitudinal strips separating the pairs of tongues, the whole being constructed in detail substantially as hereinafter described and illustrated in the accompanying drawings in which—

Figure 1 is an elevation partly in section showing my improved spring bearing in position;

Fig. 2 a side elevation of the spring ring; and

Fig. 3 a transverse section of the same.

In the drawings like numerals of reference indicate corresponding parts in the different figures.

In such apparatus as centrifugal liquid separators, to avoid shaking due to any lack of balance in the rotating parts, it is common to yieldingly support the upper end of the bowl spindle, and as the present invention relates particularly to a specific form of spring bearing only enough of the separator is indicated in the drawings to show the location of my improved spring.

Having reference particularly to Fig. 1, 1 is the casing and frame of a centrifugal separator in which the spindle 2 is suitably journaled at its lower end. 3 is a worm formed on the spindle, with which meshes the driving worm wheel 4. On the spindle is located the upper bearing 5, which has a shoulder 6 formed at its lower end to retain in position the spring ring hereinafter described.

The casing is suitably shaped to loosely receive this bearing, which has its upper end increased in diameter to rest on the wall 8 of the casing. In the upper end next the spindle is formed an annular rabbet 9 from which lead one or more holes 10 which extend downwardly and outwardly through to the outer surface of the bearing. Provision is thus made for the oiling of the spring ring hereinafter described and for the return to the bottom part of the bowl of any surplus lubricant which may creep up the spindle, the lubrication usually being by splash from within the gear case.

Between the shoulder 6 and the upper end of the bearing is fitted a sheet metal ring 13 having spring fingers 14 stamped out therefrom. These spring fingers extend lengthwise of the ring and are arranged to form a plurality of alined pairs. The free ends of these fingers are adjacent one another, but are separated so that bridges 11 are formed connecting the longitudinal strips 12 which separate the pairs of tongues. From this arrangement it follows that none of the metal of the ring is removed at the ends or at the center of the ring. The spring fingers, however, being short, I prefer to slit the ends of the ring as shown at 15, these slits extending down to or slightly beyond the bases of the fingers 14. These slits preferably terminate in small holes, which prevent the metal cracking beyond the ends of the slits.

Owing to the fact that the strips 12 are connected at the middle, I am enabled to slit one or both of the ends of the ring as described without impairing the efficiency of the device, as the central bridging effectively braces and holds the strips 12 in position so that the pressure on the spring fingers will not collapse or bend in the centers of these strips.

Owing also to this bridging the pressure on the tongues tends to press the ends of the ring into close contact with the bearing so that the ring cannot turn or creep on the same, and this gripping tendency will be increased by slitting the ends of the ring as described. By arranging the fingers in alinement extending from opposite ends of the ring, I am enabled to secure a larger number of spring fingers than is otherwise possible without unduly weakening the body of the ring by decreasing the width of the uncut metal between the portions stamped out to form the tongues. I also find by experience that there is great advantage derived from having the ends of the fingers as nearly as possible in the same zone.

For the purposes of my invention it is immaterial whether the ring be formed from a piece of tubing or from a strip of sheet metal bent round to tubular form, but having its ends free.

It will be noted that a collar 16 is secured to the spindle 2 and that a finger 17 is secured to the casing just above the collar. This arrangement is old in the art to prevent the spindle being pulled out when the bowl is lifted off. I take advantage of the arrangement for my own purposes and form a recess 18 in the top of the collar in communication with the periphery of the spindle.

What I claim as my invention is:—

1. A spring for a spring bearing formed of a sheet metal sleeve stamped out to form a plurality of pairs of tongues in alinement with one another, said tongues extending lengthwise of the sleeve and having their free ends adjacent one another, but separated so that bridges connect the longitudinal strips separating the pairs of tongues.

2. A spring for a spring bearing formed of a sheet metal sleeve stamped out to form a plurality of pairs of tongues in alinement with one another, said tongues extending lengthwise of the sleeve and having their free ends adjacent one another, but separated so that bridges connect the longitudinal strips separating the pairs of tongues, the metal of one end of the sleeve being slit for a short distance inwardly in substantial alinement with the middle of each of said longitudinal strips.

3. The combination of a casing; a spindle; a bearing for the spindle; and a spring sleeve located between the bearing and casing, a rabbet being formed in the bearing at its upper end next the spindle and a plurality of holes leading downwardly and outwardly from said rabbet to the outer surface of the bearing.

Signed at Toronto, Canada, this 31st day of October, 1917.

CHARLES McLEOD.

Witnesses:
J. G. HOSSACK,
J. V. BRYERS.

Copies of this patent may be obtained for five cents each, by addressing the "Commissioner of Patents, Washington, D. C."